United States Patent [19]

Lanpheer et al.

[11] 4,187,809
[45] Feb. 12, 1980

[54] EXHAUST SYSTEM FOR MULTIPLE CYLINDER TWO-STROKE ENGINES

[75] Inventors: Richard A. Lanpheer; David W. Kusche, both of Oshkosh, Wis.

[73] Assignee: Brunswick Corporation, Skokie, Ill.

[21] Appl. No.: 832,197

[22] Filed: Sep. 12, 1977

[51] Int. Cl.$^2$ .............. F02B 77/00; F01N 7/08
[52] U.S. Cl. .................. 123/65 EM; 60/313; 60/314
[58] Field of Search ............ 123/65 E, 65 EM, 52 M; 60/313, 314

[56] References Cited

U.S. PATENT DOCUMENTS

| | | | |
|---|---|---|---|
| 2,306,580 | 12/1942 | Wilson | 123/65 E |
| 3,494,334 | 2/1970 | Johnson | 123/65 E |
| 3,692,006 | 9/1972 | Miller et al. | 123/65 E |
| 3,695,238 | 10/1972 | Boerma | 123/65 E |
| 3,808,807 | 5/1974 | Lampheer | 123/65 E |

Primary Examiner—Ira S. Lazarus
Attorney, Agent, or Firm—Andrus, Sceales, Starke & Sawall

[57] ABSTRACT

A two-stroke internal combustion engine having at least three cylinders includes an exhaust means with an exhaust cavity, an exhaust port at each cylinder and an exhaust port extension forming a chamber between the exhaust cavity and the exhaust port. Within the exhaust cavity exhaust pulse transmission means connect the port extension of an exhausting cylinder and the port extension of a charging cylinder with a pulse transmission path of a proper length to cause the exhaust pulse from an exhausting cylinder to arrive at the exhaust port of a charging cylinder prior to the complete closing of the exhaust port of the charging cylinder thereby forcing the air fuel mixture which escaped from the exhaust port of the charging cylinder and which is within the chamber thereof back into the charging cylinder prior to the closing of the exhaust port of the charging cylinder.

13 Claims, 3 Drawing Figures

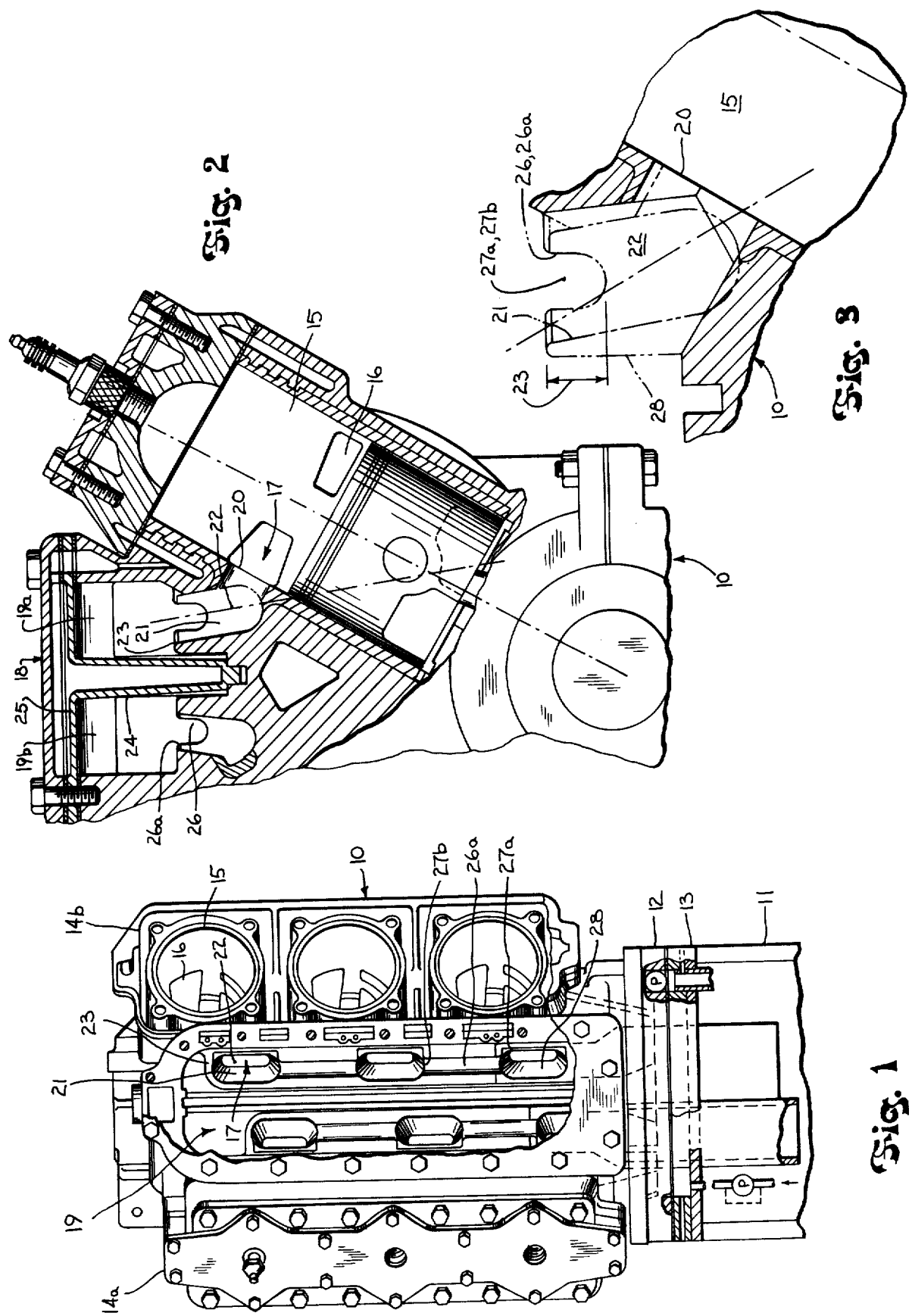

EXHAUST SYSTEM FOR MULTIPLE CYLINDER TWO-STROKE ENGINES

BACKGROUND OF THE INVENTION

This invention relates to the exhaust system for a two stroke internal combustion engine and particularly concerns a pulse tuned exhaust system.

In prior art two stroke engines the exhaust port remains open during the charging of the air-fuel mixture. Accordingly some of the new charge of air-fuel mixture escapes into the exhaust system from where it is discharged from there. The escaped fuel is lost without producing any power but the total fuel intake to the engine is used to compute the fuel economy and the horsepower of the engine.

SUMMARY OF THE INVENTION

The present invention is directed to a two stroke internal combustion engine having at least three cylinders including
 (a) an exhaust means having an exhaust cavity therein,
 (b) individual exhaust port means connected to each cylinder and to the exhaust means including
  (i) a port at the wall of a cylinder and
  (ii) an outwardly projecting wall means defining a chamber as an extension of the port, the wall means terminating in the exhaust cavity, and
 (c) exhaust pressure pulse transmission means connecting the port means of an exhausting cylinder and the port means of a charging cylinder with a pulse transmission path of a proper length to cause the exhaust pulse from an exhausting cylinder to arrive at the exhaust port means of a charging cylinder prior to the complete closing of the exhaust port whereby the air-fuel mixture which escaped from the exhaust port of the charging cylinder which is within the exhaust port means is forced back into the charging cylinder prior to the closing of the exhaust port.

BRIEF DESCRIPTION OF THE DRAWINGS

FIG. 1 is an elevational view partly in section of an outboard motor employing a six-cylinder engine utilizing an exhaust system constructed in accordance with the present invention;

FIG. 2 is a horizontal section more clearly showing the exhaust port construction of the exhaust system in accordance with this invention; and FIG. 3 is an enlarged fragmentary view of the exhaust system shown in FIGS. 1 and 2 with a conventional port unit shown in full and the exhaust port of this invention shown in phantom.

DESCRIPTION OF THE PREFERRED EMBODIMENT

FIG. 1 illustrates an outboard motor powerhead having a two stroke, six cylinder engine 10 supported upon the upper end of a drive shaft housing 11. The outboard motor lower structure is well known. It may include an exhaust extension plate 12 positioned between the lower end of the engine and an upper drive shaft housing plate 13 which is in turn positioned on the upper end of the drive shaft housing 11.

FIG. 1 illustrates the V-6 engine 10 employing two banks of three horizontally disposed cylinders in a vertical in-line arrangement. Each of the cylinders 15 include air-fuel intake means 16 and exhaust port means 17. The exhaust port means 17 exhaust into a common exhaust means 18 having an exhaust cavity 19 therein. In the engine 10 the exhaust cavity is separated into a first and second exhaust cavity 19a and 19b. The exhaust port means 17 of the first, third and fifth fired cylinder exhaust into the first exhaust cavity 19a and the exhaust port means 17 of the second, fourth and sixth fired cylinder exhaust into the second exhaust cavity 19b.

The exhaust port means 17 include the exhaust opening or port in the cylinder wall 20 and the outwardly projecting wall means or exhaust port extension 21 defining a chamber 22. In the embodiment of FIG. 1 the exhaust port 20 is the opening in the cylinder wall and the exhaust port extension 21 is the continuation of this opening to form the chamber 22 between the exhaust port 20 and the exhaust cavity 19.

Referring to FIG. 2 the exhaust port extension 21 also includes a protruding wall 23 extending into the exhaust cavity 19. The chamber 22 and protruding wall 23 are cast integral with the engine block. The protruding walls of the chambers in the first bank are separated from the protruding walls of the chambers in the second bank by an exhaust cavity separator 24 which is formed integral with the exhaust cover assembly 25.

In the embodiment illustrated in FIG. 2 the chamber 22 is positioned at an angle from the exhaust port 20. For example the center line or plane of the chamber 22 includes an angle of 40° with the center plane of the cylinders.

In two-stroke engines it has been learned that because the exhaust port remains open during the introduction of the new charge of fuel-air mixture that some of the new charge can escape through the exhaust port. It is believed that this charge is entirely lost with the exhaust gases and therefore does not provide input energy to the engine. The inventors have discovered that the escaped charge can be recovered and utilized to provide increased fuel economy as well as an increase in engine brake horsepower. First they discovered that the chamber 22 formed by the extended ports will provide containment of the escaped charge. Second as will be more fully described, they discovered that the exhaust pulse from an adjacent fired cylinder for engines having at least three cylinders can force most if not all of the escaped charge which is contained in the chamber back into the charging cylinder before the exhaust port closes. This is accomplished by an exhaust pulse transmission means 26 connecting a charging cylinder and an exhausting cylinder as will be described.

In order to use the exhaust pulse from an adjacent firing cylinder to force the escaped charge into the exhaust port 20 the exhaust pressure pulse transmission means 26 connecting the exhaust port means of an exhausting cylinder and the exhaust port means of a charging cylinder must have an exhaust pulse transmission path of a proper length to allow the exhaust pulse from the exhausting cylinder to arrive at the exhaust port means of a charging cylinder prior to the complete closing of the exhaust port so that air-fuel mixture which escaped from the exhaust port 20 of the charging cylinder which is within the extended exhaust port 21 is forced back into the charging cylinder prior to the closing of the exhaust port 20 of the charging cylinder.

The exhaust pulse transmission path length is defined as the combined length of (A) the length of the chamber 22 of the exhausting cylinder, (B) the length of the chamber 22 of the charging cylinder, and (C) the shortest distance between facing sides of two adjacent extended exhaust ports 21.

When the combined length of (A), (B) and (C) above is equal to the proper length of the exhaust pulse transmission path between the chamber 22 of an exhausting cylinder and the chamber 22 of a charging cylinder the exhaust pulse arrives at the chamber 22 of a charging cylinder before substantially any of the air-fuel mixture escapes the chamber 22 into the exhaust cavity 19 and at the exhaust port 20 prior to the closing of the exhaust port 20.

In the embodiment of FIG. 2 the exhaust pulse transmission path is shown to be between openings in the side walls of the extended port 21 of an exhausting cylinder and the extended port 21 of a charging cylinder. In this embodiment it was empirically determined that the extended port 21 must be of a specific length to provide containment of the escaped charge. But at this length one cylinder 15 can not be positioned sufficiently close to another cylinder 15 to permit the exhaust pulse to reach the charging cylinder at the proper time. It was determined that if the chamber 22 was maintained at the desired length and if the exhaust pulse transmission means included (D) a first opening 27a in the sidewall 28 of the chamber of an exhausting cylinder, (E) a second opening 27b in the sidewall of the chamber of a charging cylinder and, (F) an exhaust pulse transmission means 26 between the first and second openings 27a and 27b, the exhaust pulse from the exhausting cylinder reached the charging cylinder before its exhaust port closed. Surprisingly, even though the first and second openings 27a and 27b in the sidewall of the chamber were below the top of the chamber it was found that the exhaust pulse continued to force most if not all of the escaped charge back into the charging cylinder. It is believed this is because the escaped charge extending above the bottom of the second opening 27b is forced back into the chamber 22 by other rebounding exhaust pulses from the walls of the exhaust cavity 24 or because the escaped charge tends to follow a path through the second opening 27b and into pulse transmission channel means 26 and therefore does not extend above the bottom of the second opening 27b.

The pulse transmission channel means 26 is shown in FIG. 2 as an open channel 26a in the outer surface of the cast engine block. The channel 26a extends in a straight path between adjacent exhaust port means. The channel 26a of the embodiment of FIG. 2 extends between the protruding walls 23 of adjacent chambers and has a cross-sectional area equal to about one-half the cross-sectional area of the chamber.

The channel 26a serves to form the pulse transmission path. Therefore the depth of the channel from the top edge of the chamber 22 affects or controls the length of the pulse transmission path and accordingly the time it takes for the exhaust pulse to travel from adjacent cylinders. Therefore increasing the depth or the position at which the channel opens from the chamber 22 shortens the distance the exhaust pulse must travel thereby permitting adjustment of the transmission path length. Also, it must be taken into consideration that the speed at which the engine horsepower peaks is inversely related to the length of the transmission path length. Therefore, the larger the distance the exhaust pulse must travel, the lower the RPM at which the engine horsepower will peak and vice versa.

The cross-sectional area of the channel 26a is also significant. If the channel 26a is too small, the exhaust pulse which may occur in the form of a pressure wave having a wave front is not effectively transmitted and if it is to large the forcing back of the escaped charge into the charging cylinder is not maximized and some horsepower and fuel economy is lost.

In the preferred embodiment of FIG. 2 in a V-6 engine rated at about 175 horsepower the chamber 22 has a cross-sectional area of about 1½ to 1¾ square inches and a length of about 2 inches from the end of the exhaust port 20 to the exhaust cavity 19. The cross-sectional area of the chamber 22 and the exhaust port 20 are substantially equal to prevent expansion of the air-fuel mixture which escapes into the chamber 22.

The channel is about ½ inches wide, about ¾ inches deep and about 2¼ inches in length between the inside edge of adjacent chambers.

FIG. 3 illustrates the prior art engine with the extended port and pulse transmission channel shown in phantom. The extended port with pulse transmission channel produced an increased efficiency and horsepower as given in the following table.

| PORT EXTENDER PERFORMANCE DATA | | |
|---|---|---|
| Engine RPM | Brake Horsepower Gain | Fuel Economy Gain |
| 2000 | 8% | 6% |
| 2500 | 10% | 9% |
| 3000 | 9% | 5% |
| 3500 | 7% | 5% |
| 4000 | 5% | 3% |
| 4500 | 5% | 3% |
| 5000 | 4% | 0 |
| 5500 | 2% | 0 |

Although it has been described that the extended ports and the exhaust pulse transmission means as well as other parts are cast integral with the engine block they may be formed as separate attachable pieces. For example the extended exhaust ports 21 could be cast as a tubular member and attached between the exhaust port 20 and the exhaust means 18 and the exhaust pulse transmission means 26 can be formed of a separate part mounted between the openings in the adjacent extended exhaust ports. Also, although the exhaust pulse transmission means 26 is described as an open channel 26a it can be a tubular member or even a hole in the cast engine block or part thereof.

We claim:

1. A two stroke internal combustion engine having at least three cylinders comprising:
   (a) an exhaust means having an exhaust cavity therein,
   (b) individual exhaust port means connected to each cylinder and to said exhaust means including
      (1) a port at the wall of a cylinder and
      (2) an outwardly projecting wall means defining a chamber as an extension of said port, said wall means terminating in said exhaust cavity, and
   (c) exhaust pulse transmission wall means connected to the projecting wall means and connecting the port means of an exhausting cylinder and the port means of a charging cylinder and said transmission wall means including a pulse transmission passageway of a proper length to cause the exhaust pulse from an exhausting cylinder to arrive at the exhaust port means of a charging cylinder prior to the complete closing of the exhaust port whereby the air-fuel mixture which escaped from the exhaust port of the charging cylinder which is within the exhaust port means is forced back into the charging cylinder prior to the closing of said exhaust port.

2. The engine of claim 1 having a pulse transmission passageway length of a shorter length than the combined length of two exhaust port means and the shortest distance between facing sides of two adjacent exhaust port means.

3. The engine of claim 1 wherein said exhaust pulse transmission passageway is an open channel means in the transmission wall means between adjacent port means.

4. An internal combustion two-stroke V-engine having two banks of cylinders each of which includes at least three cylinders comprising
   (a) each of said cylinders having individual exhaust outlet port means and individual fuel-air inlet port means arranged such that a fresh fuel-air charge is introduced prior to the closing of the exhaust port means to effect scavenging of the exhaust gas.
   (b) exhaust means having a common exhaust cavity between said two banks for a plurality of cylinders, and having a central dividing means defining separate cavity portions for each bank of cylinders,
   (c) said individual exhaust outlet port means connected to each cylinder for discharging the exhaust gases to said exhaust cavity including
      (i) a port in the wall of the cylinder
      (ii) an outwardly projecting tubular wall extending from said port and defining a chamber having an unobstructed outer end opening terminating in said common exhaust cavity and
   (d) a pulse transmission channel wall means in each of said cavity portions connected between said chambers and each including a channel for transmitting an exhaust pulse from one port means to a second port means, said pulse transmission channel having an established length to permit the arrival of the exhaust pulse at a charging cylinder prior to the closing of the exhaust port thereof.

5. The engine of claim 4 formed in a V-6 configuration including at least two sets of three cylinders with each set of three cylinders having the cylinders connected to the crankcase 120° apart wherein
   each of said exhaust cavity portions include means to transmit a positive pulse to the exhaust port of each of said cylinders.

6. A two-stroke internal combustion engine having at least three spaced engine cylinders comprising
   (a) a cylinder wall for each cylinder having an exhaust port therein;
   (b) a common exhaust having an exhaust cavity therein,
   (c) and a charge collecting passageway connecting between each exhaust port and said cavity to form a chamber therebetween,
      (i) said chamber having a length combined with the distance between the chamber of an exhausting cylinder and the chamber of a charging cylinder sufficient to permit the exhaust pulse transmitted from the exhaust port of said exhausting cylinder to arrive at the exhaust port of the charging cylinder prior to the closing of the exhaust port thereof, and
      (ii) said chamber having a volume sufficient to contain substantially all of the air-fuel mixture escaping from said charging cylinder until the arrival of said exhaust pulse,
   whereby the air-fuel mixture escaping from said charging cylinder is all substantially forced back therein prior to the closing of the exhaust port thereof.

7. The engine defined in claim 6 wherein the cross-sectional area of said chamber is about equal to the cross-sectional area of the exhaust port.

8. The engine defined in claim 6 wherein each of said chambers include
   (i) an end lip portion having a sidewall therein projecting into said exhaust cavity and
   (ii) said sidewall includes a side opening therethrough having a cross-sectional area smaller than the cross-sectional area of said chamber.

9. The engine defined in claim 8 wherein said side opening connects to an exhaust pulse transmission means having a cross-sectional area about equal to the cross-sectional area of said side opening, said second exhaust pulse transmission means connecting to a side opening in another chamber.

10. A two-stroke internal combustion engine having at least three spaced engine cylinders comprising
    (a) a cylinder wall for each cylinder having an exhaust port therein;
    (b) a common exhaust means having an exhaust cavity therein,
    (c) a charge collecting passageway connecting between said exhaust port and said cavity to form a chamber therein,
    (d) exhaust pulse transmission wall means in said cavity connecting the chamber of an exhausting cylinder with the chamber of a charging cylinder, said transmission wall means including a transmission passageway between said cylinders providing the required distance therebetween to permit the arrival of the exhaust pulse
       (i) at the chamber of a charging cylinder before substantially any of the air-fuel mixture escapes the chamber into the exhaust cavity, and
       (ii) at the exhaust port prior to the closing of the exhaust port.

11. A two-stroke internal combustion engine having at least three cylinders comprising
    (a) a common exhaust means having an exhaust cavity
    (b) an extended exhaust port connecting each of said cylinders with said exhaust cavity
    (c) and an exhaust pulse transmission wall means in said cavity connecting an exhausting cylinder with a charging cylinder and having a passageway for connecting said ports and at a position.
       (i) adjacent the exhaust end of said extended port,
       (ii) within the exhaust cavity, and
       (iii) at a distance from the exhaust port sufficient to provide a required exhaust pulse path length.

12. The internal combustion engine defined in claim 11 wherein the exhaust pulse transmission is between the open ends of the extended port of an exhausting cylinder and the extended port of a charging cylinder.

13. The internal combustion engine defined in claim 11 wherein the exhaust pulse transmission is between openings in the sidewalls of the extended port extending within the exhaust cavity of an exhausting cylinder and the extended port of a charging cylinder.

* * * * *